Dec. 1, 1959 W. WEBER ET AL 2,915,254
TENSION AND DIAMETER CONTROL FOR A WINDING MOTOR
Filed April 9, 1956

INVENTORS:—
WOLFGANG WEBER
HANS LOHEST

BY:—
Marzall, Johnston, Cook & Root.
ATT'YS

2,915,254

2,915,254

TENSION AND DIAMETER CONTROL FOR A WINDING MOTOR

Wolfgang Weber and Hans Lohest, Remscheid-Lennep, Germany, assignors to Barmer Maschinenfabrik Aktiengesellschaft, Wuppertal-Oberbarmen, Germany Application April 9, 1956, Serial No. 576,970

Claims priority, application Germany April 20, 1955

6 Claims. (Cl. 242—45)

The present invention relates in general to the winding and reeling of flexible material, and has more particular reference to the winding of thread or like filamentary material upon tubes, spools, mandrels, reels, bobbins, and similar filament receivers.

An important object of the present invention is to provide for winding filamentary material upon a receiver at approximately uniform speed and in accordance with a desired filament tension program.

Another important object is to provide for controlling filament winding operations, so as to automatically adjust the speed of a winding receiver in accordance with the rate of delivery of filamentary material thereto, so that the material may be wound upon the receiver under desired tension.

Another important object is to provide filament winding equipment of exceedingly simple, inexpensive, yet rugged construction, and hence capable of providing trouble free service over extended operating periods, equipment of the sort heretofore provided being of complex, delicate and trouble prone character, and correspondingly expensive to make and to maintain in operation.

Another important object is to provide winding equipment of the character mentioned, in which the filament receiver is driven by an electric motor energized for operation preferably at a substantially constant field excitation level, including means for regulating motor speed by adjusting the magnetic flux field of the motor in accordance with the regulation desired; a further object being to provide for changing the rotor driving magnetic field of the motor by axially adjusting the relative position of the armature and field components of the motor; a further object being to provide a magnetic conduction component, at one end of the armature, to accommodate that portion of the magnetic flux field component which extends in the space vacated by the motor driving portions of the armature when the same is axially shifted with respect to the field component for speed regulating purposes.

Another important object is to control the speed of the motor by means of a sensing member, preferably in the form of a lever, which feels the filamentary material to be wound, as by suspending the sensing member in a loop formed in the filamentary material in its path of travel from a supply source to the winding receiver, such sensing member being adapted to detect any disparity between the rate at which the filamentary material is delivered from a supply source and the winding speed at which the filamentary material is accepted by and applied upon the receiver; another object being to provide for regulating the speed of a filament-winding, receiver-driving motor in accordance with changes in the diameter of filamentary material on the winding receiver, as by means of a sensing element which continuously bears upon and hence feels the circumference of the filamentary material as wound upon the receiver; a still further object of the invention being to provide for controlling the speed of the receiver driving motor in response not only to conditions prevailing in the filament, as at a bight therein, during delivery thereof to the receiver, but also to the diametral size of the filamentary material as wound on the receiver.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings.

Figure 1:
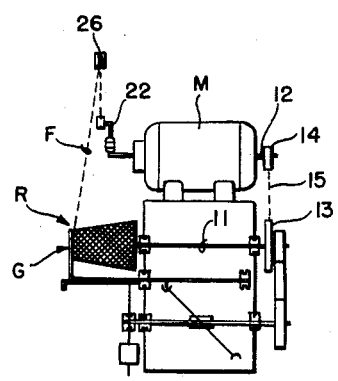
Fig. 1 is a schematic diagram of filament winding apparatus, including a controllable motor for driving the same, said motor embodying the features of the present invention.
Figure 2:
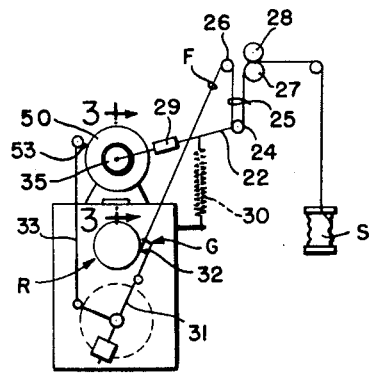
Fig. 2 is a view of the apparatus of Fig. 1 as seen from the left hand side thereof.
Figure 3:
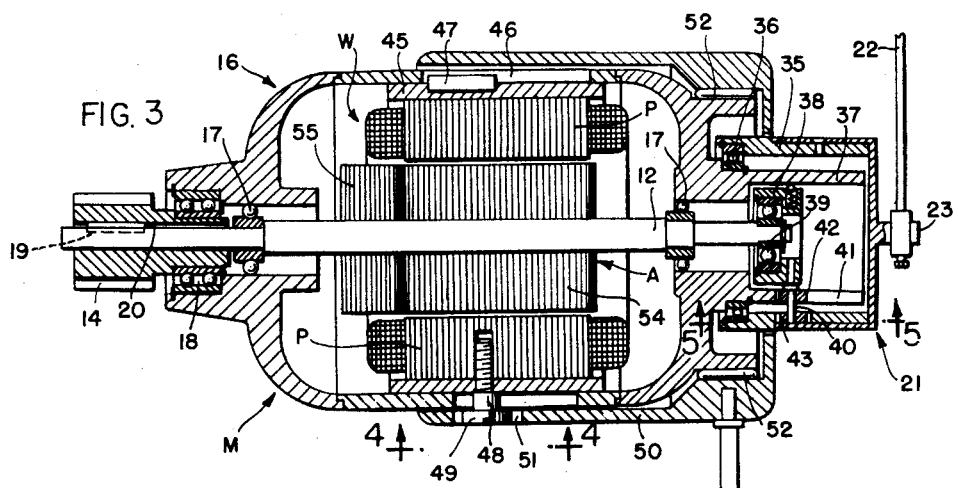
Figure 4:
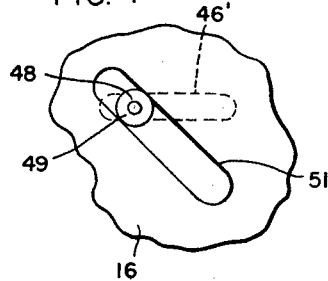
Figure 5:
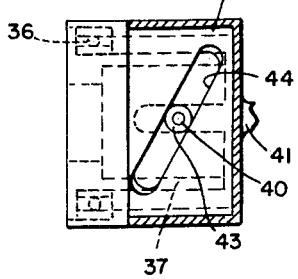

Fig. 3 is a sectional view taken substantially along the line 3—3 in Fig. 2; and Figs. 4 and 5 are views taken substantially along and in the direction of the lines 4—4 and 5—5 in Fig. 3.

To illustrate the invention, the drawings show a winding device comprising a winding shaft or spindle 11 adapted to support and to drivingly turn a winding receiver R, of any suitable, convenient or preferred sort, such as a tube, mandrel, spool, reel or bobbin, any suitable, preferred or conventional bearing means being employed for supporting the shaft 11 for turning movement. In accordance with the present invention, filamentary material F, such as thread, may be delivered from a supply source, such as a storage reel S, through a thread guide G for winding upon the receiver R as the same is turned on and by the spindle 11. The winding spindle 11 may be drivingly connected with the shaft 12 of a variable speed electric motor M by any suitable transmission means, such as gears 13 and 14 on the shafts 11 and 12, and drivingly interconnected as by a chain 15.

The motor M of the present invention may comprise an armature A supported on the shaft 12, and a main frame 16 formed to provide support for field windings W and associated circumferentially spaced pole pieces P of the motor, said frame being also formed to provide support for suitable bearings 17 in which the shaft 12 is mounted to support the amature for turning movement with respect to the frame, the windings W and the pole pieces P supported thereon. It should be understood, however, that the armature and field components of the motor may be transposed and supported respectively on the frame and shaft instead of on the shaft and frame, as shown.

In accordance with the present invention, the motor is adapted to operate in response to excitation of the field windings W preferably at a substantially constant electrical energy level, means being provided for controlling motor speed by relatively adjusting the armature and field compoents of the motor in a direction of the rotary axis of the motor, such relative axial displacement changing the magnetic flux exerted by the field component upon the armature component to drive the same, thereby controlling the operating speed of the motor. Relative axial movement of the armature and field components of the motor may be accomplished by mounting either the armature component, or the field component, or both for relative axial movement with respect to the frame 16.

In order to allow the armature to be shifted axially with respect to the field components of the motor, the shaft supporting bearings 17 may be of a sort permitting the shaft and the motor component supported thereon to rotate freely with respect to the frame 16, and also to be shifted axially thereof, within limits. In this connection, the gear 14 may be rotatably supported on the frame 16 by means of suitable roller bearings 18 which may serve to turnably support the driving gear 14 and also to hold the same against relative axial movement in the frame 16.

The shaft 12 may have an end extending within and drivingly connected with the gear 14, as by means of a spline 19 on the shaft, in position extending in a groove 20 formed in the gear, thereby allowing relative axial sliding movement of the shaft 12 with respect to the driven gear 14.

Operable means 21 is provided for adjusting the relative axial position of the armature with respect to the field windings and poles of the motor, in response to fluctuations in the delivery rate of filamentary material to the winding mechanism, in order to maintain desired tension in the material as it is applied upon the winding receiver. To this end, axial adjustment of the shaft 12, in the frame 16, may be effected under the control of a sensing member 22, preferably comprising a lever pivoted for rocking movement about a fulcrum axis 23 and carrying a filament feeling element, such as a roller 24, on the lever remote from the fulcrum axis. The lever 22 may be supported upon a bight 25, formed in the filament, as between a roller 26 and a pair of delivery rollers 27 and 28, which are preferably driven at substantially constant speed for drawing filament from the supply source S and delivering the same through the bight and around the rollers 24 and 26, and thence to the filament receiver R.

Suitable means may be provided for biasing the sensing lever in a direction on its fulcrum 23 to apply winding tension in the filament, at the bight 25, by the roller 24. Such biasing means, if desired, may comprise a weight 29, which may be adjusted longitudinally of the lever, between the fulcrum 23 and the roller 24, in order accurately to determine the tension applied to the thread at the bight; or the lever may be biased by means of a spring 30, which may also be adjustable, if desired. Of course, both a weight 29 and a spring 30, operating in conjunction and simultaneously, may be employed to obtain desired winding tension in the filament. If desired, the weight and spring may be made to act differentially upon the lever 22.

Any disparity between the rate at which the filament F is delivered from the storage reel, by operation of the rollers 27 and 28, and the winding speed at the receiver R, will result in movement of the lever 22 in one direction or the other about the axis of its fulcrum, as determined by the length of filament contained in the bight 25. The lever 22 is thus made capable of sensing such disparity and of correspondingly adjusting the axial position of the shaft 12 in order to appropriately alter the speed of the motor M and thereby offset or correct the sensed disparity by correspondingly changing the driven speed of the filament receiver.

To this end, the arm 22 may be drivingly connected with a cam drum structure 35 journaled on the motor frame 16 for rocking movement about the axis of the shaft 12, as by means of suitable roller bearings 36, said cam drum structure encircling a sleeve-like extension 37 of the motor frame, which extension is preferably concentric with respect to the shaft 12 and disposed at the end of the motor frame remote from the gear 14. The extension 37 is sized to slidably receive a support member 38 of ring-like configuration carrying a roller bearing 39, by means of which an end of the shaft 12 may be turnably secured in the support member 38 in fashion preventing relative axial movement of the shaft with respect to said support member.

The ring-like support member 38 may carry a cam engaging pin 40 extending radially outwardly thereof through a slot 41 formed in the extension sleeve 37 and extending in a direction parallel to the shaft 12. The cam pin 40 may be and preferably is fitted with a roller 42 adapted for rolling engagement in the slot 41. The pin 40 may also carry a roller 43 adapted to extend within and to drivingly engage a helically inclined slot 44 formed in the drum structure 35. As a consequence of the foregoing arrangement, the shaft 12 and the motor component carried thereon may be adjusted in the frame 16, in either direction axially of the shaft, in response to rocking movement of the drum structure 35 about the axis of the shaft in one direction or the other, such rocking movement being caused by the action of the lever 22 in response to the combined action thereon of the filament at the bight 25 and the biasing means comprising the weight 29, or the spring 30, or both.

The filament feeler arm 22 always adapts itself to the length of filamentary material that is disposed between the feed rollers 27, 28 and the winding receiver R, so that the filamentary material may be delivered under such tension as is applied thereto by the action of the biased lever upon the filamentary material at the bight 25. Any variation or differential between the rate of supply of filamentary material, by the feed rollers 27 and 28, and the rate at which the receiver accepts the filamentary material, will be sensed by the arm 22 and immediately applied, through the drum 35, to alter the speed of the receiver driving motor and thus adjust for the so sensed speed variation, in order to maintain a desired tension in the filament.

The thread guide G may be of any suitable, preferred or conventional form, and any suitable guide actuating mechanism may be provided for causing the same to travel back and forth in front of the winding receiver R, in order to guide the filamentary material F onto the receiver in a desired winding pattern during the winding operation. As shown, the thread guide G is carried on a swing weighted lever 31 carrying a roller 32 adapted to ride upon the outer surface of material wound on the receiver R at the thread guide G. Accordingly, the lever 31 will be moved on its pivot in one direction or the other, in accordance with changes in the diameter of filamentary material wound on the receiver R.

A connecting rod 33 may be attached to the lever 31 and also to the motor, to relatively shift the armature and field components thereof in response to variations in the diameter of filamentary material wound on the receiver as detected by the arm 31.

To this end, the field components comprising the pole pieces P and windings W may be mounted in a preferably cylindrical carrying shell 45 sized for axial sliding movement in the frame 16, the frame being formed with a longitudinally extending slot 46 for slidingly receiving a spline or feather 47 carried by the shell 45. On the side of the frame 16 remote from and preferably diametrically opposite the slot 46, the frame may be formed with a similar longitudinally extending slot 46' through which a driving pin 48, carried by the shell 45, may extend, said pin carrying a cam engaging roller 49 on the end thereof which extends outwardly of the motor frame 16.

In order to move the shell 45 and the motor components thereon longitudinally on the frame 16, the present invention contemplates the use of a sleeve-like driving member 50 snugly embracing and journaled for rocking movement on and about the motor frame 16, said driving member having driving portions enclosing the frame at the longitudinal slots 46 and 46', said driving portions being formed with a preferably helically inclined slot 51 adapted to receive the roller 49. By relatively turning the driving member 50 about the axis of the motor, in one direction or the other, the carrying shell 45 and motor field components supported thereon may be moved axially in the motor structure by the camming action of the driving pin 48 in the slots 46' and 51. To facilitate operation of the member 50, the same may be journaled upon the motor frame 16, as by means of roller bearings 52, for rocking movement thereon about the axis of the shaft 12; and the member 50 may be provided with an outstanding arm 53 adapted for connection with the rod 33, in order that the field components of the motor may be shifted in response to movement of the lever 31.

It will be seen from the foregoing that the winding apparatus provides for a basic control of motor speed dependent upon changes in diameter of filamentary material as the same is wound upon the receiver, in conjunction with a correctional control of motor speed dependent upon any variation in the length of filamentary material between filament feeding rollers and the winding receiver. Such control, as shown in the illustrated embodiment, may be obtained by providing for the accomplishment of a desired basic control through axial displacement of the motor component which is supported on the frame 16, correctional control being accomplished by axial displacement of the shaft supported component. It is, however, within the contemplation of the present invention, that basic control in response to size change in receiver wound material, be accomplished by axial movement of the shaft supported component, with correctional control produced by movement of the frame mounted component.

Relative axial movement of the armature and field components of the motor will either increase or reduce the magnetic flux therebetween, thereby changing the speed of the motor. If, for example, the armature should be shifted from the position shown in Fig. 3 toward the right hand end of the motor, motor speed would be reduced, because the active motor driving portion of the armature would be moved outwardly of the field component at the right hand end thereof, and would thus be withdrawn from the influence of motor driving flux exerted by the field component. Conversely, when the armature is disposed in position within and in alinement with the pole structure of the motor field component, the motor may operate at maximum speed, because exposed to a maximum field of motor driving flux.

At one end of the armature and outwardly of its active motor driving portion 54, the shaft 12 may carry a magnetic field conducting structure 55 adapted, when the active motor driving portion of the armature is displaced from within the field component of the motor, to fill the space within the field component thus vacated by the armature portion 54 when in shifted position. In this connection, the magnetic field conducting structure 55 may be designed, with respect to its magnetic properties, in such fashion that the magnetic flux passing thereto from the field component, will leave the active motor driving portion 54 entirely unaffected, or such flux may be employed in such a manner as to axially urge the armature to shift its position in one direction or the other, whereby armature shifting force applied through the actuating means 21 can be better adapted to desired requirements.

It will be seen from the foregoing that the present invention particularly contemplates approximate speed adjustment of the driving motor in accordance with change in diametral size of filamentary material as wound on the receiver, and a precise adjustment of motor speed in accordance with the precise amount of filamentary material as indicated by the length of a bight formed therein, from time to time prevailing between the filament supply means and the receiver on which the filamentary material is being wound, such approximate and precise speed adjustment being accomplished by axially shifting the field and armature components of the receiving driving motor.

It is thought that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the forms herein disclosed being a preferred embodiment for the purpose of illustrating the invention.

The invention is hereby claimed as follows:

1. A filament winding device comprising a shaft for turning a filament receiver, a motor drivingly connected with said shaft and embodying armature and field components mounted for relative turning movement about the axis of the motor, said components being relatively shiftable in the direction of said axis to vary the operating speed of the motor, means for adjusting the relative axial position of said components in response to change in diameter in filamentary material wound on the receiver, and separate means for adjusting the relative axial position of said components in response to any change in the differential rate of delivery of filamentary material from a supply source and the rate at which the material is applied upon the receiver.

2. A filament winding device comprising a shaft for turning a filament receiver, a motor drivingly connected with said shaft, said motor comprising a frame, an armature component and a field component, means for mounting one of said components as a rotor on the frame for turning movement with respect to the other component about the axis of the motor, the other of said components being mounted as a stator on said frame for axial adjustment in either direction to vary the operating speed of the motor, said rotor being also axially adjustable on said frame to additionally regulate the operating speed of the motor, actuating means operable in response to changes in the diameter of filamentary material wound on the receiver for adjusting one of said components axially on the frame, and additional actuating means for adjusting the other component axially on the frame in response to changes in the differential rate of delivery of filamentary material from a supply source and the rate at which the material is applied upon the receiver.

3. A filament winding device comprising a shaft for turning a filament receiver, a motor drivingly connected with said shaft, said motor comprising a frame, an armature component and a field component, means for mounting one of said components as a rotor on the frame for turning movement with respect to the other component about the axis of the motor, the other of said components being mounted as a stator on said frame for adjustment in the direction of said axis to determine the operating speed of the motor, said rotor being also adjustable on said frame in the direction of said axis to additionally regulate the operating speed of the motor, actuating means operable in response to change in diameter of filamentary material wound on the receiver for adjusting said stator on the frame, and means for adjusting the rotor on the frame in response to change in the differential between the rate of delivery of filamentary material from a supply source and the rate at which the material is applied upon the receiver.

4. A filament winding device comprising a shaft for turning a filament receiver, a motor drivingly connected with said shaft, said motor comprising a frame, an armature component and a field component, means for mounting one of said components as a rotor on the frame for turning movement with respect to the other component about the axis of the motor, the other of said components being mounted as a stator on said frame for adjustment in the direction of said axis to determine the operating speed of the motor, said rotor being also adjustable on said frame in the direction of said axis to additionally regulate the operating speed of the motor, actuating means operable in response to change in diameter of filamentary material wound on the receiver for adjusting said field component on the frame, and means for adjusting the armature component on the frame in response to change in the differential between the rate of delivery of filamentary material from a supply source and the rate at which the material is applied upon the receiver.

5. A filament winding device comprising a shaft for turning a filament receiver, a motor drivingly connected with said shaft, said motor comprising a frame, an armature component and a field component, means for mounting one of said components as a rotor on the frame for turning movement with respect to the other component about the axis of the motor, the other of said components being mounted as a stator on said frame for adjustment in the direction of said axis to determine the operating speed of the motor, said rotor being also adjustable on said frame in the direction of said axis to additionally regulate the operating speed of the motor, actuating means operable in response to change in diameter of filamentary material wound on the receiver for adjusting one of said components on the frame, and additional actuating means for adjusting the other component on the frame in response to change in the differential between the rate of delivery of filamentary material from a supply source and the rate at which the material is applied upon the receiver, said actuating means embodying a cam member rockable on the frame about the axis of the motor for adjusting a said motor component axially on the frame in either direction.

6. A filament winding device comprising a shaft for turning a filament receiver, a motor drivingly connected with said shaft, said motor comprising a frame, an armature component and a field component, means for mounting one of said components as a rotor on the frame for turning movement with respect to the other component about the axis of the motor, the other of said components being mounted as a stator on said frame for adjustment in the direction of said axis to determine the operating speed of the motor, said rotor being also adjustable on said frame in the direction of said axis to additionally regulate the operating speed of the motor, actuating means operable in response to change in diameter of filamentary material wound on the receiver for adjusting one of said components on the frame, additional actuating means for adjusting the other component on the frame in response to change in the differential between the rate of delivery of filamentary material from a supply source and the rate at which the material is applied upon the receiver, said frame being formed with a slot in position extending parallel to the axis of the motor, a driving pin secured on a said motor component and extending in said slot, and a sleeve formed with a helical cam slot drivingly associated with said pin, said sleeve being journaled on said frame for rocking movement about the axis of said motor to adjust the associated motor component axially on the frame in either direction.

References Cited in the file of this patent

UNITED STATES PATENTS

| | | |
|---|---|---|
| 1,514,474 | Stewart | Nov. 4, 1924 |
| 1,693,617 | Oswald | Dec. 4, 1928 |
| 2,153,252 | Hunsdorf | Apr. 4, 1939 |
| 2,317,290 | McIlvried | Apr. 20, 1943 |
| 2,583,074 | Allbert | Jan. 22, 1952 |
| 2,748,334 | Miller | May 29, 1956 |
| 2,765,989 | Pell | Oct. 9, 1956 |

FOREIGN PATENTS

| | | |
|---|---|---|
| 691,864 | Germany | June 7, 1940 |